(12) United States Patent
Yoshida et al.

(10) Patent No.: US 8,024,381 B2
(45) Date of Patent: Sep. 20, 2011

(54) RECORDING APPARATUS, FILE MANAGEMENT METHOD, PROGRAM FOR FILE MANAGEMENT METHOD, AND RECORDING MEDIUM HAVING PROGRAM FOR FILE MANAGEMENT METHOD RECORDED THEREON

(75) Inventors: Haruo Yoshida, Kanagawa (JP);
Masaharu Murakami, Tokyo (JP);
Hiroshi Jinno, Tokyo (JP)

(73) Assignee: Sony Corporation, Tokyo (JP)

( * ) Notice: Subject to any disclaimer, the term of this patent is extended or adjusted under 35 U.S.C. 154(b) by 460 days.

(21) Appl. No.: 11/512,787

(22) Filed: Aug. 30, 2006

(65) Prior Publication Data

US 2006/0294121 A1    Dec. 28, 2006

Related U.S. Application Data

(62) Division of application No. 10/786,927, filed on Feb. 25, 2004, now Pat. No. 7,249,144.

(30) Foreign Application Priority Data

Feb. 27, 2003  (JP) ................................ P2003-051001

(51) Int. Cl.
*G06F 7/00*  (2006.01)

(52) U.S. Cl. ........................................ 707/821; 707/802
(58) Field of Classification Search ........... 707/1, 104.1, 707/821, 802; 714/16; 718/100
See application file for complete search history.

(56) References Cited

U.S. PATENT DOCUMENTS

| 2003/0061537 | A1* | 3/2003 | Cha et al. ................. 714/16 |
| 2004/0024778 | A1* | 2/2004 | Cheo ...................... 707/104.1 |
| 2008/0016507 | A1* | 1/2008 | Thomas et al. ............ 718/100 |

FOREIGN PATENT DOCUMENTS

| JP | 2001 273714 | 10/2001 |
| JP | 2002 56651  | 2/2002  |
| JP | 2003 16722  | 1/2003  |
| JP | 2003 50811  | 2/2003  |

* cited by examiner

*Primary Examiner* — Shahid Alam
*Assistant Examiner* — Donald Lawson
(74) *Attorney, Agent, or Firm* — Frommer Lawrence & Haug LLP; William S. Frommer

(57) ABSTRACT

A recording apparatus such as an optical disk and a file management method are disclosed by which wastefulness caused by free slots in an index file can be reduced. To each slot of a property entry of the index file, valid/invalid information representative of whether the slot is valid or invalid is set. Further, to the header of the property entry, a last valid slot number indicative of a last one of those slots which are set to valid with the valid/invalid information is set.

3 Claims, 9 Drawing Sheets

FIG. 2

| | |
|---|---|
| header-size | unit(16) |
| brand-type = 'udv' | unit(32) |
| header-type = 'titl' | unit(32) |
| header-version | unit(16) |
| header-data-size | unit(16) |
| unique-ID | unit(128) |
| /* title entry information */ | |
| title-entry-version | unit(16) |
| entry-size | unit(16) |
| if(entry-index-size in P.F.H == 2) { | |
|     reserved = 0 | unit(16) |
|     maximum-entry-count | unit(16) |
| }else{ | |
|     maximum-entry-count | unit(32) |
| } | |
| /*Textual Data Type Table */ | |
| number-of-data-types | |
| for(i = 0; i < number-of-data-types; i++){ | |
|     data-type-ID | unit(16) |
|     description | n-string |
| } | |
| /*extension data unit payload */ | |
| Extension Data Unit Payload | |
| padding | |

FIG. 3

| | |
|---|---|
| header-size | unit(16) |
| brand-type = 'udv' | unit(32) |
| header-type = 'thum' | unit(32) |
| header-version | unit(16) |
| header-data-size | unit(16) |
| /* thumbnail entry information */ | |
| thumbnail-picture-entry-version | unit(16) |
| entry-size | unit(16) |
| if(entry-index-size in P.F.H == 2) { | |
|     reserved = 0 | unit(16) |
|     maximum-entry-count | unit(16) |
| }else{ | |
|     maximum-entry-count | unit(32) |
| } | |
| codec type | unit(32) |
| width | unit(16) |
| height | unit(16) |
| color-depth | unit(16) |
| (TBD) | unit(16) |
| /* extension data unit payload */ | |
| Extension Data Unit Payload | |
| padding | |

FIG. 4

| ENTRY NUMBER |
| --- |
| IDENTIFICATION INFORMATION |
| VALID/INVALID FLAG |
| EXTENSION SLOT NUMBER |
| TEXT PRESENCE/ABSENCE FLAG |
| TEXT SLOT NUMBER |
| TEXT EXTENSION FLAG |
| THUMBNAIL PRESENCE/ABSENCE FLAG |
| THUMBNAIL SLOT NUMBER |
| THUMBNAIL EXTENSION FLAG |
| SOUND PRESENCE/ABSENCE FLAG |
| SOUND SLOT NUMBER |
| SOUND EXTENSION FLAG |
| OTHER ATTRIBUTE INFORMATION, MANAGEMENT INFORMATION |

FIG. 5

| | |
|---|---|
| header-size | unit(16) |
| brand-type | unit(32) |
| header-type | unit(32) |
| header-version | unit(16) |
| header-data-size | unit(16) |
| unique-id | unit(8) [16] |
| /* property entry information */ | |
| property-entry-version | unit(16) |
| entry-size | unit(16) |
| creation-time | unit(32) |
| modification-time | unit(32) |
| property-status-flags | unit(32) |
| entry-index-size | unit(16) |
| if (entry-index-size == 2) { | |
|     reserved = 0 | unit(16) |
|     maximum-entry-count | unit(16) |
|     next-entry-index | unit(16) |
|     reserved = 0 | unit(16) |
|     root-folder-entry-index | unit(16) |
|     reserved = 0 | unit(16) |
|     last-valid-entry-index | unit(16) |
| } else { | |
|     maximum-entry-count | unit(32) |
|     next-entry-index | unit(32) |
|     root-folder-entry-index | unit(32) |
|     last-valid-entry-index | unit(32) |
| } | |

FIG. 6

```
/* title file information */
number-of-title-files                                          unit(16)
fro (i = 0; i < num-of title-files; i++) {
        title-file-ID                                          unit(48)
        if (entry-index-size == 2) {
                reserved = 0                                   unit(16)
                number-of-title-entries-in-this-file           unit(16)
        } else {
                number-of-title-entries-in-this-file           unit(32)
        }
}
/* thumbnail picture file information */
number-of-thumbnail-files                                      unit(16)
for (i = 0; i < num-of-thumbnail-files; i++) {
        thumbnail-picture-file-id                              unit(48)
        if (entry-index-size == 2) {
                reserved = 0                                   unit(16)
                number-of-thumbnail-picture-entries            unit(16)
-in-this-file
        } else {
                number-of-thumbnail-picture-entries            unit(32)
-in-this-file
        }
}
/* extension data unit payload */
Extension Data Unit Payload
padding                                                        unit(8)[x]
```

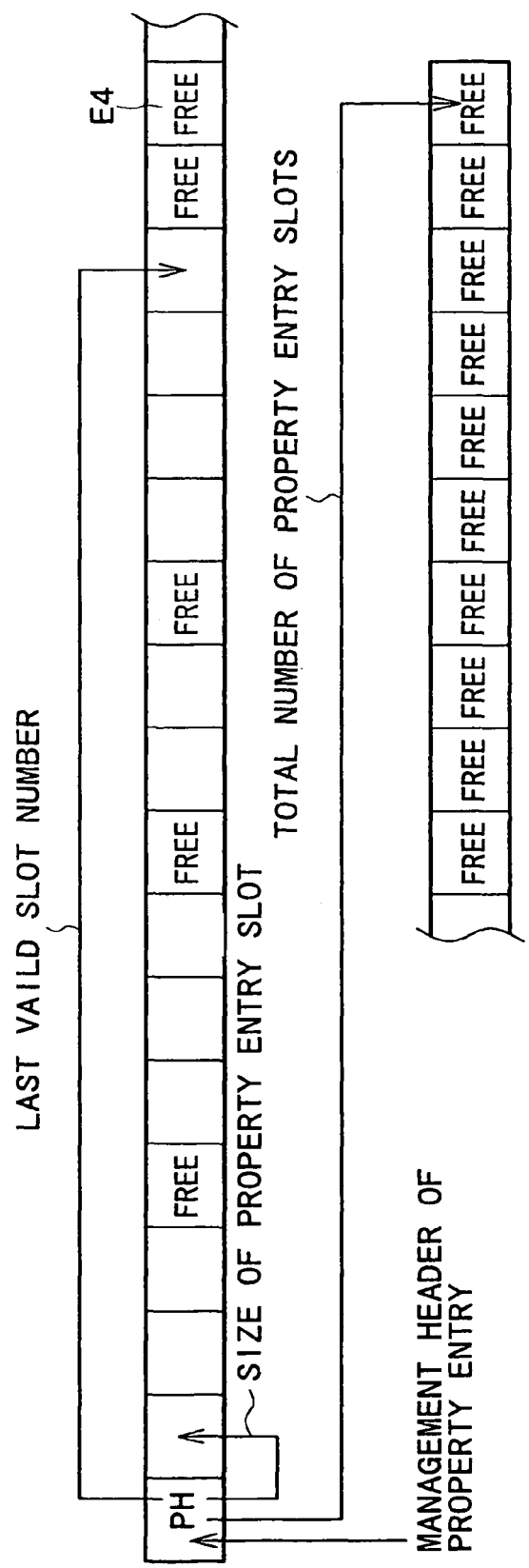

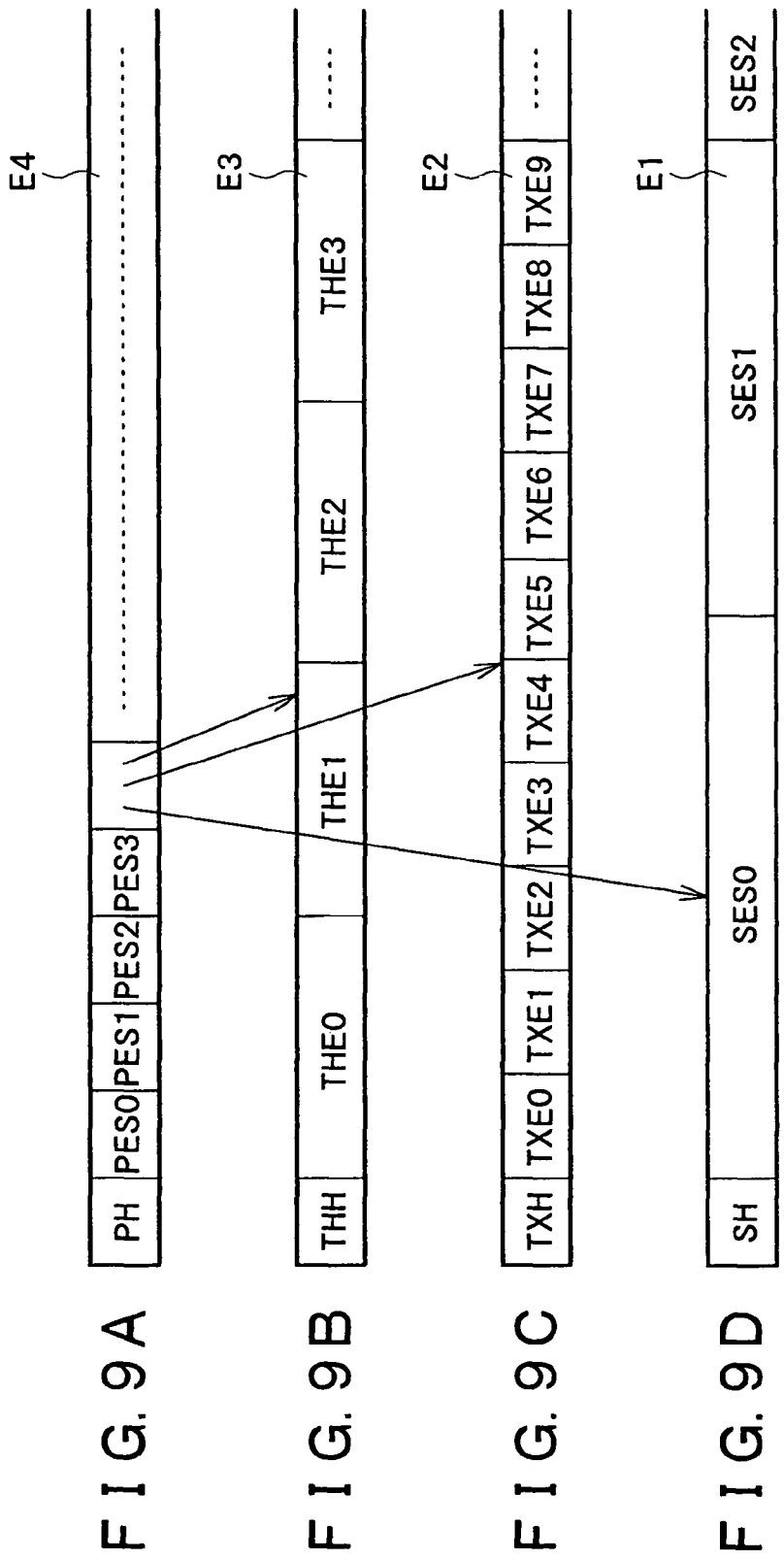

US 8,024,381 B2

RECORDING APPARATUS, FILE MANAGEMENT METHOD, PROGRAM FOR FILE MANAGEMENT METHOD, AND RECORDING MEDIUM HAVING PROGRAM FOR FILE MANAGEMENT METHOD RECORDED THEREON

This is a division of application Ser. No. 10/786,927, filed Feb. 25, 2004, now U.S. Pat. No. 7,249,144 which is entitled to the priority filing date of Japanese application 2003-051001, filed in Japan on Feb. 27, 2003, the entirety of which is incorporated herein by reference.

BACKGROUND OF THE INVENTION

This invention relates to a recording apparatus, a file management method, a program for a file management method and a recording medium having a program for a file management method recorded thereon and can be applied typically to an optical disk apparatus.

In recent years, disk apparatus and the like have been proposed which use a randomly accessible recording medium having a large capacity such as an optical disk.

A method is disclosed, for example, in Japanese Patent Laid-Open No. 2001-84705 (hereinafter referred to as Patent Document 1) which uses such a disk apparatus as described above to improve the operability in operation of a large number of files. According to the method of the Patent Document 1, an index file for indexing a large number of files recorded on a recording medium is produced from the large number of files and recorded on the recording medium. The large number of files on the recording medium can be operated using the index file.

Japanese Patent Laid-Open No. 2002-278996 (hereinafter referred to as Patent Document 2) discloses a method which further improves the operability in operation of a large number of files recorded on a recording medium. According to the method of the Patent Document 2, an index file produced in such a manner as described above manages the files hierarchically.

In the methods described above, an index file is composed of a part of actual data which collectively includes extract information formed by extracting information relating to a management object file and so forth and another part of management data which collectively includes position information and so forth necessary for accessing to the actual data.

Referring to FIGS. 9A to 9D, the actual data part is composed of a sound entry E1, a text entry E2, a thumbnail picture entry E3 and a property entry E4 which are data sets which collectively include extract information classified for individual types into groups. The sound entry E1 has allocated thereto a disk title and extract information of audio data for a short period of time representative and contents of management object files. The sound entry E1 includes a sound entry header SH set at the top thereof and representing that the entry is the sound entry E1 and a sequence of sound entry slots SES0, SES1, SES2, . . . each including extract information collected as a block.

The text entry E2 has allocated thereto the disk title and extract information of a character sequence of management object files. The text entry E1 includes a text entry header TXH set at the top thereof and representing that the entry is the text entry E1 and a sequence of text entry slots TEXS0, TXES1, TXES2, each including extract information collected as a block.

The thumbnail picture sensor E3 has allocated thereto the disk title and extract information of still pictures representative of contents of the management object files. The thumbnail picture sensor E3 includes a thumbnail picture entry header THH set at the top thereof and representing that the entry is the thumbnail picture entry E3 and a sequence of thumbnail picture entry slots THES0, THES1, THES2, each including extract information collected as a block.

In contrast, the property entry E4 has allocated thereto the disk title and data representative of properties of the management object files and has allocated thereto extract information of binary data which are set to the management object files. The property entry E4 includes a property entry header PH set at the top thereof and representing that the entry is the property entry E4 and a sequence of property entry slots PES0, PES1, PES2, . . . each including extract information collected as a block.

Consequently, for example, when a desired file is to be selected with reference to thumbnail pictures, when a file is to be selected based on titles, or in some other case, the index file can provide extract information set to a corresponding one of the entries E1 to E4 to the user in accordance with a selection criterion of the user so that the user can select a desired file simply, easily and with certainty.

Incidentally, where extract information is classified for different kinds of property information into groups to form the entries E1 to E4 in this manner, depending upon the type of the management object file, also such a situation possibly occurs that, although a corresponding slot is present in the property entry E4 without fail, no corresponding slot is present in some other entry or entries. Thus, it is expected that, if each of the slots of the property entry E4 has recorded therein management information for managing the slots of the property entry E4 and the corresponding slots of the other entries and the slots recorded in the other entries E1 to E3 are referred to in accordance with the management information as indicated by arrow marks in FIGS. 9A to 9D, then the management of the extract information can be simplified.

Further, if one of the different kinds of management information to be set to each of the slots of the property entry E4 is flags which individually represent whether the slot itself and corresponding slots of the other entries are valid or invalid and the flags are set so as to indicate that they are free or empty slots, then if only the flags are suitably operated upon deletion of a management object file, then the corresponding extract information can be deleted from the index file. Consequently, it is expected that management relating to the index file can be simplified.

Further, in the index file described above, since the length of the extract information sometime varies, it is expected that, if the slots of the index file are formed with a fixed length and extract information relating to one file is allocated to one or a plurality of slots while free or empty slots are allocated to the entries taking such variation of the extract information into consideration, then possible wastefulness when the entries are recorded on a recording medium can be eliminated and a drop of the processing speed can be prevented effectively. In particular, if the measures described above are taken, then even if the number of management object files varies, logical positions and physical positions of the entries on the recording medium can be allocated to individually continuous regions, and consequently, the index file can be read out at a high speed.

However, where the measures described above are taken, a great number of free or empty slots may appear in the index file, and in a process of reading out the index file from the recording medium, useless slots may be read out in vain. Further, for example, where all of the slots of the property entry are read out and stored into a memory and a management object file is processed with reference to the index file stored in the memory, the information of the free slots is recorded wastefully in the memory, and the capacity of the memory is consumed uselessly.

One of possible solutions to the problem just described is to record the number of valid slots in the property entry header. In this instance, however, while data of the property entry is read out from the recording medium, it is necessary to discriminate the flag set in each of the slots thus read out to count the number of valid slots. Therefore, a longer period of time is required for the reading out of the property entry as much.

It is to be noted that, where the data of the property entry is read out from the recording medium in this manner, since the reading out process is performed upon starting of the pertaining apparatus, an increased period of time as much is required for the starting of the apparatus. The waiting time upon such starting appears conspicuously where the apparatus is a recording apparatus which requires a comparatively long period of accessing time like an optical disk apparatus.

SUMMARY OF THE INVENTION

It is an object of the present invention to provide a recording apparatus, a file management method, program for a file management method and a recording medium having a program for a file management method recorded thereon by which the wastefulness caused by free slots can be reduced.

In order to attain the object described above, according to the present invention, a slot of a property entry has set therein valid/invalid information representative of whether the slot is valid or invalid, and a last valid slot number indicative of the last one of those slots which are set to valid with the valid/invalid information is set in the header of the property so that the wastefulness caused by free slots can be reduced.

In particular, according to an aspect of the present invention, there is provided a recording apparatus, including means for recording desired files on a recording medium, and index file production means for producing an index file of the files recorded on the recording medium from extract information of the files and a folder, the index file production means being operable to classify the extract information for individual types of the extract information into groups including a group of property to which property information of the files is allocated and a different group different from the group of property, to allocate, in the different group of the extract information, the extract information of one of the files or the folder to one or a plurality of slots of a fixed length, and to allocate, in the group of property, the extract information of the one file or the folder to one or a plurality of slots of the fixed length so that the group of property has slots corresponding to the slots at least of the different group to produce the index file, the index file production means setting, in each of the slots of the group of property, management information for managing the slot and a corresponding slot of the different group, the index file production means setting, in the management information of each of the slots of the group of property, at least a slot number for specifying the corresponding slot of the different group and valid/invalid information representative of whether each of the slot of the group of property and the corresponding slot of the different group is valid or invalid, the index file production means setting, in a header of the group of property, a last valid slot number for specifying a last one of those of the slots of the group of the property which are set to valid with the valid/invalid information.

In the recording apparatus, extract information of files recorded on a recording medium are classified for individual types of the extract information into groups including a group of property to which property information of the files is allocated and a different group different from the group of property. In the different group of the extract information, the extract information of one of the files or the folder is allocated to one or a plurality of slots of a fixed length while, in the group of property, the extract information of the one file or the folder is allocated to one or a plurality of slots of the fixed length so that the group of property has slots corresponding to the slots at least of the different group to produce an index file. In each of the slots of the group of property, management information for managing the slot and a corresponding slot of the different group is set. In the management information of each of the slots of the group of property, at least a slot number for specifying the corresponding slot of the different group and valid/invalid information representative of whether each of the slot of the group of property and the corresponding slot of the different group is valid or invalid. Further, in a header of the group of property, last valid slot number for specifying a last one of those of the slots of the group of the property which are set to valid with the valid/invalid information is set. Consequently, even where the slots of the index file are formed with a fixed length and include a large number of free slots taking a variation of the extract information into consideration, the group of property can be reproduced up to the last slot set to valid based on the last valid slot number while omitting wasteful reproduction of the free slots succeeding the last slot. Consequently, wasteful reproduction of such free slots can be reduced and besides wasteful use of a memory for storing reproduced data of the slots can be reduced.

According to another aspect of the present invention, there is provided a file management method for managing a plurality of files recorded on a recording medium, including the steps of classifying extract information of the files and a folder for individual types of the extract information into groups including a group of property to which property information of the files is allocated and a different group different from the group of property, allocating, in the different group of the extract information, the extract information of one of the files or the folder to one or a plurality of slots of a fixed length, and allocating, in the group of property, the extract information of the one file or the folder to one or a plurality of slots of the fixed length so that the group of property has slots corresponding to the slots at least of the different group to produce an index file, each of the slots of the group of property having set therein management information for managing the slot and a corresponding slot of the different group, the management information of each of the slots of the group of property having set therein at least a slot number for specifying the corresponding slot of the different group and valid/invalid information representative of whether each of the slot of the group of property and the corresponding slot of the different group is valid or invalid, a header of the group of property having set therein a last valid slot number for specifying a last one of those of the slots of the group of the property which are set to valid with the valid/invalid information.

According to a further aspect of the present invention, there is provided a program for a file management method for causing a computer to execute a predetermined procedure to manage a plurality of files recorded on a recording medium, the processing procedure including the steps of classifying extract information of the files and a folder for individual types of the extract information into groups including a group of property to which property information of the files is allocated and a different group different from the group of property, allocating, in the different group of the extract information, the extract information of one of the files or the folder to one or a plurality of slots of a fixed length, and allocating, in the group of property, the extract information of the one file or the folder to one or a plurality of slots of the fixed length so that the group of property has slots corresponding to the slots at least of the different group to produce an index file, each of the slots of the group of property having set therein management information for managing the slot and a corresponding slot of the different group, the management information of each of the slots of the group of property having set therein at least a slot number for specifying the corresponding slot of the different group and valid/invalid information representative of whether each of the slot of the group of property and the corresponding slot of the different group is valid or invalid, a header of the group of property having set therein a last valid slot number for specifying a last one of those of the slots of the group of the property which are set to valid with the valid/invalid information.

According to a still further aspect of the present invention, there is provided a recording medium on which a program for a file management method for causing a computer to execute a predetermined procedure to manage a plurality of files recorded on the recording medium is recorded, the processing procedure including the steps of classifying extract information of the files and a folder for individual types of the extract information into groups including a group of property to which property information of the files is allocated and a different group different from the group of property, allocating, in the different group of the extract information, the extract information of one of the files or the folder to one or a plurality of slots of a fixed length, and allocating, in the group of property, the extract information of the one file or the folder to one or a plurality of slots of the fixed length so that the group of property has slots corresponding to the slots at least of the different group to produce an index file, each of the slots of the group of property having set therein management information for managing the slot and a corresponding slot of the different group, the management information of each of the slots of the group of property having set therein at least a slot number for specifying the corresponding slot of the different group and valid/invalid information representative of whether each of the slot of the group of property and the corresponding slot of the different group is valid or invalid, a header of the group of property having set therein a last valid slot number for specifying a last one of those of the slots of the group of the property which are set to valid with the valid/invalid information.

Also with the file management method, program for a file management method and recording medium having a program for a file management method recorded thereon, wastefulness caused by free slots can be reduced.

In summary, by setting, to each slot of a group of property, valid/invalid information representative of whether the slot is valid or invalid and setting, to the header of the group of property, a last valid slot number indicative of the last one of those slots which are set to valid with the valid/invalid information, wastefulness caused by free slots can be reduced.

The above and other objects, features and advantages of the present invention will become apparent from the following description and the appended claims, taken in conjunction with the accompanying drawings in which like parts or elements denoted by like reference symbols.

BRIEF DESCRIPTION OF THE DRAWINGS

FIG. 2 is a table illustrating a header of a text entry;
FIG. 3 is a similar view but illustrating a header of a thumbnail picture entry;
FIG. 4 is a table illustrating a property entry;
FIGS. 5 and 6 are tables illustrating a header of a property entry;
FIG. 7 is a diagrammatic view illustrating a valid/invalid flag of the property entry;
FIGS. 9A to 9D are diagrammatic views illustrating an index file.

DESCRIPTION OF THE PREFERRED EMBODIMENTS

1. First Embodiment 1-1. Configuration of the Optical Disk Apparatus

Figure 1:
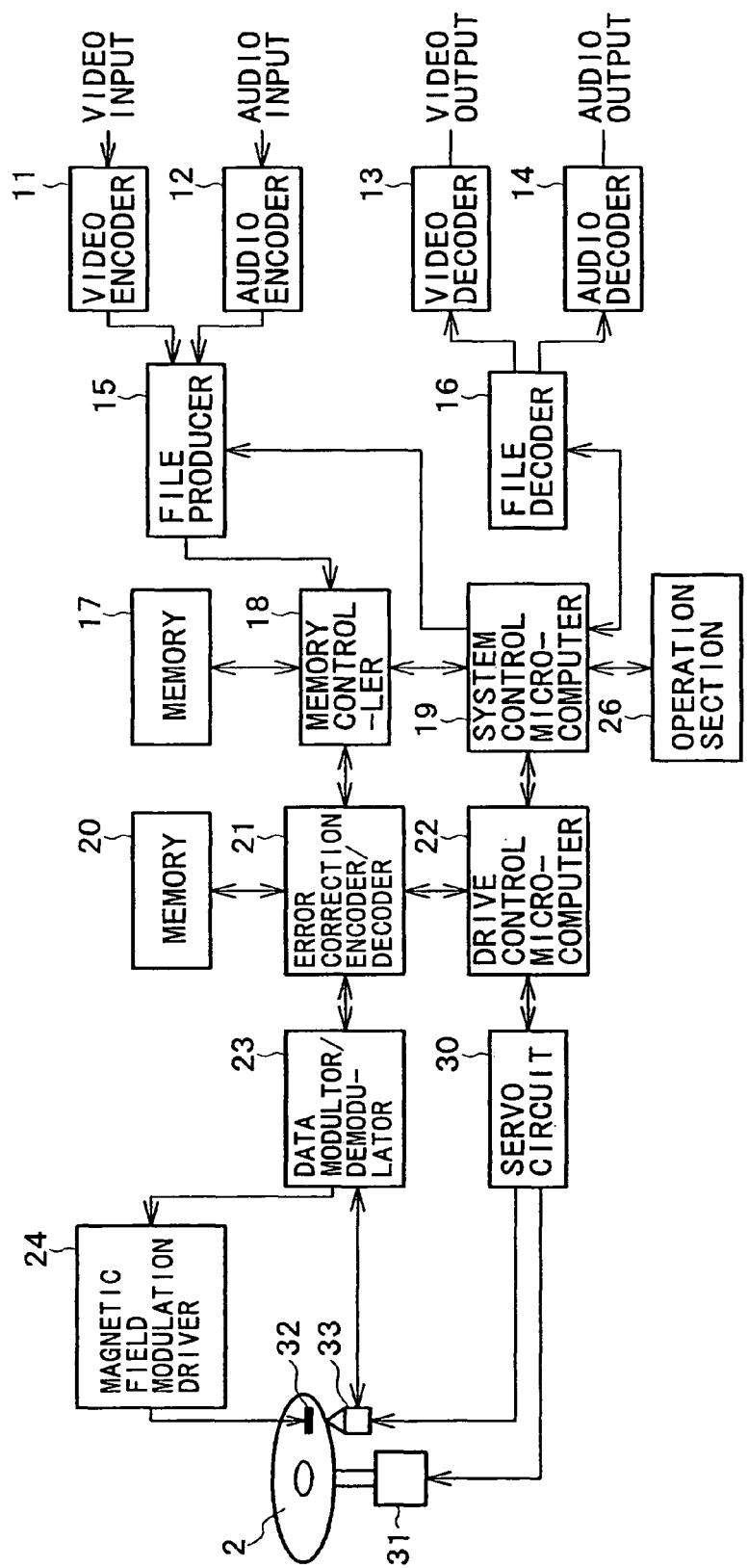
FIG. 1 is a block diagram showing an optical disk apparatus according to a first embodiment of the present invention.

FIG. 1 shows an optical disk apparatus according to a first embodiment of the present invention. The optical disk apparatus 1 acquires a video signal and an audio signal of an image pickup object by means of an image pickup section and a sound acquisition section not shown and records a result of image pickup as the video signal and audio signal on an optical disk 2. Further, the optical disk apparatus 1 reproduces the result of the image pickup recorded on the optical disk 2 and outputs it from a displaying section in the form of a liquid crystal display panel and a sound outputting section in the form of a speaker and further outputs it to an external equipment. The optical disk apparatus 1 converts such a video signal and an audio signal of the image pickup result into streaming data in accordance with a format of the MPEG (Moving Picture Experts Group) and then records the streaming data in accordance with a predetermined file format on the optical disk 2. In the present embodiment, the QuickTime is applied as the predetermined file format just described. It is to be noted that, while, in the present embodiment, an index file is produced in accordance with the QuickTime format in this manner, various file formats can be applied to the index file as hereinafter described. Also as a recording medium, not only an optical disk but also various recording media such as hard disk and a flash memory can be applied.

In the optical disk apparatus 1, a video encoder 11 performs an analog/digital conversion process for a video signal of a result of image pickup to produce video data and then encodes the video data in accordance with the format of the MPEG. Consequently, an elementary stream of the video data is outputted from the video encoder 11.

An audio encoder 12 performs an analog/digital conversion process for an audio signal of a result of image pickup to produce audio data and then encodes the audio data in accordance with the format of the MPEG. Consequently, an elementary stream of the audio data is outputted from the audio encoder 12.

A file producer 15 performs, upon recording, a multiplexing process for the elementary streams outputted from the video encoder 11 and the audio encoder 12 and produces a QuickTime movie file under the control of a system control microcomputer 19.

A memory controller 18 changes over operation thereof under the control of the system control microcomputer 19. Upon recording, the memory controller 18 successively records and temporarily retains a data string of a QuickTime movie file outputted from the file producer 15 and various data outputted from the system control microcomputer 19 into a memory 17 and then outputs the retained data so as to be processed by a succeeding error correction encoder/decoder 21. On the other hand, upon reproducing, the memory controller 18 temporarily retains output data from the error correction encoder/decoder 21 and outputs the retained data to a file decoder 16 and the system control microcomputer 19.

The error correction encoder/decoder 21 changes over operation thereof under the control of the system control microcomputer 19, and upon recording, temporarily records output data from the memory controller 18 into a memory 20 and adds an error correction code to the temporarily recorded data. Further, the error correction encoder/decoder 21 reads out and outputs the data retained in the memory 29 in such a manner as just described in accordance with a predetermined order. Thereupon, the data are interleaved, and the interleaved data are outputted to a data modulator/demodulator 23. On the other hand, upon reproduction, the error correction encoder/decoder 21 temporarily records data outputted from the data modulator/demodulator 23 into the memory 20 in accordance with a predetermined order and then outputs the data conversely to those upon recording. Thereupon, the error correction encoder/decoder 21 performs a deinterleave process for the data outputted from the data modulator/demodulator 23 and outputs the interleaved data to the memory controller 18. Further, at this time, the error correction encoder/decoder 21 performs an error correction process with the error correction code added upon recording.

The data modulator/demodulator 23 changes over operation thereof under the control of the system control microcomputer 19. Upon recording, the data modulator/demodulator 23 converts output data from the error correction encoder/decoder 21 into a serial data string and then performs a modulation process for the serial data string, and outputs the modulated serial data string to a magnetic field modulation driver 24 or an optical pickup 33. On the other hand, upon reproduction, the data modulator/demodulator 23 reproduces a clock from a reproduction signal outputted from the optical pickup 33 and performs a binary identification process and a demodulation process for the reproduction signal with reference to the clock. Consequently, the data modulator/demodulator 23 acquires reproduction data corresponding to the serial data string produced upon recording and outputs the reproduction data to the error correction encoder/decoder 21.

Where a magneto-optical disk is used as the optical disk 2, upon recording, the magnetic modulation driver 24 drives a magnetic field head 32 with an output signal of the data modulator/demodulator 23 under the control of the system control microcomputer 19. Here, the magnetic field head 32 is held so as to face the optical pickup 33 with the optical disk 2 interposed therebetween, and applies a modulation magnetic field based on the output data from the data modulator/demodulator 23 to an irradiation position of a laser beam of the optical pickup 33. Consequently, in the optical disk apparatus 1, where a magneto-optical disk is used as the optical disk 2, a QuickTime movie file and so forth are recorded on the optical disk 2 using a thermomagnetic recording method.

The optical disk 2 is a disk type recording medium. In the present embodiment, as the optical disk 2, a rewritable optical disk such as a magneto-optical disk (MO), a phase change type disk or the like is used. A spindle motor 31 drives the optical disk 2 to rotate in accordance with a condition such as a constant linear velocity (CLV), a constant angular velocity (CAV), a zone constant linear velocity or the like suitable for the optical disk 2 under the control of a servo circuit 30.

The servo circuit 30 controls operation of the spindle motor 31 based on various signals outputted from the optical pickup 33 to perform a spindle controlling process. Further, the servo circuit 30 similarly controls the optical pickup 33 to perform a tracking control and a focusing control process, and further causes the optical pickup 33 and the magnetic field head 32 to perform seeking operation and executes a process such as a focus searching process.

A drive control microcomputer 22 controls operation of seeking and so forth of the servo circuit 30 in accordance with an instruction of the system control microcomputer 19.

The optical pickup 33 irradiates a laser beam upon the optical disk 2 and receives the reflected light by means of a predetermined photodetector, and then arithmetically operates a result of the light reception to produce various control signals. The optical pickup 33 outputs the control signals and further outputs a reproduction signal whose signal level varies in response to a pit string or a mark string formed on the optical disk 2. Further, the optical pickup 33 changes over operation thereof under the control of the system control microcomputer 19, and where the optical disk 2 is a magneto-optical disk, upon recording, the optical pickup 33 intermittently raises the luminous energy of the laser beam to be irradiated upon the optical disk 2. Consequently, in the optical disk apparatus 1, a QuickTime movie file or a like file is recorded onto the optical disk 2 by a pulse train method. On the other hand, where the optical disk 2 is a phase change type disk or the like, the optical pickup 33 raises the luminous energy of the laser beam to be irradiated upon the optical disk 2 from that upon reproduction to that upon writing. Consequently, a QuickTime movie file or the like is recorded on the optical disk 2 by applying a thermal recording method.

The optical disk apparatus 1 compresses a video signal and an audio signal of a result of image pickup by means of the video encoder 11 and the audio encoder 12 to individually convert them into elementary streams and then converts the elementary streams into a QuickTime movie file by means of the file producer 15. Data of the QuickTime movie file is sent successively through the memory controller 18, error correction encoder/decoder 21 and data modulator/demodulator 23 to the optical pickup 33. The data of the QuickTime movie file is recorded on the optical disk 2 by the optical pickup 33 or by the optical pickup 33 and the magnetic field head 32 together with data of an index file and so forth.

Further, the optical disk apparatus 1 processes a reproduction signal obtained by the optical pickup 33 by means of the data modulator/demodulator 23 to obtain reproduction data and then processes the reproduction data by means of the error correction encoder/decoder 21. Consequently, a QuickTime movie file, the index file and so forth recorded on the optical disk 2 can be reproduced, and the reproduced QuickTime movie file, index file and so forth are outputted from the memory controller 18.

The file decoder 16 receives data of the QuickTime movie file outputted from the memory controller 18, decomposes the data into elementary streams of video data and audio data, and outputs the elementary streams. A video decoder 13 decompresses the elementary stream of the video data and outputs the decompressed elementary stream to a display apparatus or external equipment not shown. An audio decoder 14 decomposes the elementary stream of the audio data outputted from the file decoder 16 and outputs the decompressed elementary stream to a sound outputting apparatus or external equipment not shown. Consequently, in the optical disk apparatus 1, a result of image pickup reproduced from the optical disk 2 can be monitored.

It is to be noted that the optical disk apparatus 1 includes an interface for allowing connection of an external apparatus such as a computer thereto. Consequently, the optical disk apparatus 1 can record output of the external apparatus in place of data of an image pickup result on the optical disk 2 and reproduce a file recorded on the optical disk 2 so that the file can be processed by the external apparatus.

An operation section 26 includes various operation elements of the optical disk apparatus 1 and a touch panel disposed on a liquid crystal display panel, and issues a notification of various operations by the user to the system control microcomputer 19.

The system control microcomputer 19 is a computer which controls operation of the entire optical disk apparatus 1. If loading of the optical disk 2 is detected through execution of a predetermined processing procedure recorded in a memory not shown, then the system control microcomputer 19 causes the optical pickup 33 to perform seeking operation to the innermost circumference and reproduce management information of a file managing system regarding the optical disk 2. Further, the system control microcomputer 19 acquires the reproduced management information from the memory controller 18 and stores it into a built-in memory. Consequently, the system control microcomputer 19 detects an address each file recorded on the optical disk 2 and a free region of the optical disk 2.

If the system control microcomputer 19 searches the management information acquired in this manner and detects that an index file is recorded on the optical disk 2, then it controls the optical pickup 33 to perform seeking operation to the recorded position of the index file and reproduce the index file. Then, the system control microcomputer 19 acquires the reproduced index file from the memory controller 18 and records and retails it into and in the built-in memory. Consequently, in the present embodiment, the overall operability is improved in processing of files recorded on the optical disk 2 through utilization of the index file. It is to be noted that the index file can be recorded on the innermost circumference side of a user area of the optical disk 2 to reduce the start-up time.

The system control microcomputer 19 controls operation of the entire optical disk apparatus 1 using the index file in response to an operation of the user. In particular, the system control microcomputer 19 causes thumbnail images and so forth to be displayed on a liquid crystal display panel for monitoring based on the index file to introduce contents of QuickTime movie files recorded on the optical disk 2. Then, the system control microcomputer 19 accepts selection of a file by the user from among the introduced QuickTime movie files and causes the file selected by the user to be reproduced based on corresponding management information.

On the other hand, if an instruction to record an image pickup result is issued by the user, then the system control microcomputer 19 detects a free region in accordance with the management information and causes the optical pickup 33 to perform seeking operation to the free region, and records successively obtained image pickup results onto the optical disk 2. Further, the system control microcomputer 19 updates the management information retained in the memory so as to correspond to records of QuickTime movie files by such recording of the image pickup results. Then, upon ejection of the optical disk 2 or the like, the system control microcomputer 19 updates the management information of the optical disk 2 in accordance with the updated management information. It is to be noted that the updating of the management information is executed by outputting the management information retained and updated in the memory to the error correction encoder/decoder 21 through the memory controller 18.

In the processes described above, the system control microcomputer 19 outputs various kinds of information necessary for production of a QuickTime movie file to be used for recording to the file producer 15. Further, the system control microcomputer 19 acquires information necessary for production of an index file through the file producer 15. The system control microcomputer 19 uses the thus acquired information, information outputted to the file producer 15 and other necessary information to update the index file retained in the memory regarding a QuickTime movie file to be recorded newly on the optical disk 2. Then, the system control microcomputer 19 updates the index file recorded on the optical disk 2 with the updates index file retained in the memory in a similar manner as in the updating process of management information.

On the other hand, if an instruction to perform editing such as deletion of a file recorded or addition of a file to be recorded on the optical disk 2 is issued by the user, then the system control microcomputer 19 updates the index file and the management information retained in the memory in a similar manner as upon recording so as to cope with processing in the editing. Then, the system control microcomputer 19 updates the index file and the management information of the optical disk 2 with the index file and the management information retained in the memory. It is to be noted that, if the index file is not recorded although QuickTime movie files are recorded on the optical disk 2, the system control microcomputer 19 produces an index file in accordance with an instruction of the user. Then, the system control microcomputer 19 stores the index file into the memory and records the index file on the optical disk 2. In this process, the system control microcomputer 19 reproduces pertaining portions of QuickTime movie files from the optical disk 2 to acquire information necessary for production of an index file from the memory controller 18.

1-2. Index File

In the present embodiment, the index file is used to manage information necessary for reproduction by a file management system of the optical disk 2 such as an address of a recorded position, a file name and a file length of a file similarly to various files recorded on the optical disk 2 such as a QuickTime movie file. The index file includes extract information of management object files and so forth for introduction of contents of the QuickTime movie files of an object of management recorded on the optical disk 2.

If a QuickTime movie file recorded on the optical disk 2 is selected based on the index file, then the optical disk apparatus 1 reproduces the selected file from the optical disk 2 based on the file management system of the optical disk 2. Consequently, even where a large number of QuickTime files are recorded on the optical disk 2, the optical disk apparatus 1 can select a desired file rapidly and accurately, and therefore, the operability can be improved as much.

In the present embodiment, the index file includes extract information extracted from information relating to QuickTime movie files and allocated and other necessary information to information which introduces contents of the QuickTime movie files. Therefore, the contents of the QuickTime movie files can be grasped simply and readily from the index file.

The index file is composed of four files including a property entry, a thumbnail picture entry, a text entry and a sound entry described hereinabove as an example with reference to FIGS. 9A to 9D and is written and read between the optical disk 2 and the memory in accordance with an instruction of the system control microcomputer 19.

The extract information is extracted from part of management object files which introduce contents of the management object files with the index file. Therefore, although the extract information varies depending upon the types of the management object files, where the management object files are QuickTime movie files of video data and audio data as in the present embodiment, four kinds of data, that is, property data, text data, thumbnail picture data and sound data are applied to the extract data. It is to be noted that only the property data is essentially required while the other kinds of data may be selectively deleted or data of some other group or groups of a different kind or kinds not listed here may be additionally used depending upon circumstances.

The property data is attribute information which represents an attribute of the disk title or a management object file, and extract information in the form of binary data set to the disk title or a management object file is allocated together with management information of the other extract information and so forth. The text data includes data representative of a character string of the disk title or the title of a management object file.

The thumbnail picture data includes data of a still picture representative of the disk title or a management object file, and, for example, the top picture of a management object file is allocated to the thumbnail picture of the management object file. In contrast, to the thumbnail picture of the disk title or the like, a thumbnail picture, for example, of a specific management object file is allocated in accordance with selection of the user. It is to be noted that the thumbnail picture of each management object file may otherwise be set by selection of the user.

The sound data is audio data for a short period of time representative of contents of a management object file. To the sound data of a management object file, audio data for several seconds, typically for 5 seconds, for example, after reproduction of a corresponding file is started is allocated. In contrast, to the sound data of the disk title or the like, sound data, for example, of each specific management object file is allocated by selection of the user. It is to be noted that also the sound data of a management object file may otherwise be set by selection of the user.

Thus, in the optical disk apparatus 1, the system control microcomputer 19 acquires and decodes video data and audio data compressed by the file producer 15 and produces a sample picture from the video data through sampling of pixels of the video data. Meanwhile, with regard to the audio data, a required portion of it is cut out to produce sound data. Further, the system control microcomputer 19 produces title data from file information of each management object file stored in the file management system of the optical disk 2 in accordance with setting of the user. In contrast, the property data is produced in response to an operation of the user by the system control microcomputer 19. It is to be noted that such thumbnail picture and sound data are compressed and allocated to the index file as occasion demands.

The index file includes actual data grouped for the individual kinds of extract information and collected for the individual groups such that the extract information forms a plurality of data sets grouped for the individual kinds thereof. In the index file, headers PH, THH, TXH and SH are set at the tops of the individual groups as seen in FIGS. 9a to 9d, respectively, and in each group, following the header PH, THH, TXH or SH, actual data are allocated to slots of a fixed length. Consequently, in the index file, extract information formed from a train of slots following each of the headers PH to SH is registered, and the property entry E4, thumbnail picture entry E3, text entry E2 and sound entry E1 described hereinabove with reference to FIGS. 9A to 9D are formed individually. Where it is difficult to allocate extract information regarding a file or the like to one slot, extract information from a management object file or the like is allocated to a plurality of slots.

The text entry is also called title entry, and FIG. 2 is a table illustrating the header of the title entry E2 formed in such a manner as described above. Referring to FIG. 2, the header of the title entry E2 has successively allocated therein information representative of a header size "header-size", a type of the brand "brand-type", a type of the header "header-type" and a version of the header "header-version". In the title entry, "udv" and "tite" are allocated to the type of the brand and the type of the header, respectively, so that; the entry in which the header is provided can be identified as the title entry, and further, the version can be detected.

The header of the title entry E2 further has successively allocated therein an actual data size of the header "header-data-size", a unique ID unique to the header "unique-ID" and information of the title entry "title entry information". In the header of the title entry E2, a version of the title entry "title-entry-version" and a slot size of the title entry-"entry-size" are allocated to the information of the title entry. Further, an upper limit value "maximum-entry-count" to the number of slots of the title entry on a format wherein the entry index of the property entry header has a 2-byte length and another upper limit value "maximum-entry-count" to the number of slots of the title entry on another format wherein the entry index of the property entry header has a length other than the 2-byte length are successively allocated next to the information of the title entry.

Further, in the header of the title entry E2, information relating to a table of the text data type "Textual Data Type Table" is successively allocated corresponding to actual data of the text entry next to the upper limit value to the slot number. In particular, in the information "Textual Data Type Table" of the table, the number of data types "number-of-data-types" is provided first, and following it, a data type ID "data-type-ID" and a data type description character string "description" are successively repeated.

Further, in the header of the title entry E2, a unique extension region "Extension Data Unit Payload" and a padding "padding" are allocated next. Consequently, in the present embodiment, the format of the QuickTime movie file is utilized effectively to form the title entry E2.

In contrast, FIG. 3 is a table illustrating the header of the thumbnail picture entry. Referring to FIG. 3, the header of the thumbnail picture entry has successively allocated therein information representative of a header size "header-size", a type of the brand "brand-type", a type of the header "header-type" and a version of the header "header-version". In the thumbnail picture entry, "udv" and "thum" are allocated to the type of the brand and the type of the header, respectively, so that the entry in which the header is provided can be identified as the thumbnail picture entry, and further, the version can be detected.

The header of the thumbnail picture entry further has successively allocated therein an actual data size of the header "header-data-size" and information of the thumbnail picture entry "thumbnail entry information". In the header of the thumbnail picture entry, a version of the thumbnail picture entry "thumbnail-picture-entry-version" and a slot size of the thumbnail picture entry "entry-size" are allocated to the information of the thumbnail picture entry. Further, an upper limit value "maximum-entry-count" to the number of slots of the thumbnail picture entry on a format wherein the entry index of the property entry header has a 2-byte length and another upper limit value "maximum-entry-count" to the number of slots of the thumbnail picture entry on another format wherein the entry index of the property entry header has a length other than the 2-byte length are successively allocated next to the information of the title entry. Next to the upper limit value to the number of slots, a codec type "codec type", a width of the thumbnail picture "width", a height of the thumbnail picture "height" and a color depth of the thumbnail picture "color-depth" are allocated. Next to the color depth of the thumbnail picture entry, a unique extension region "Extension Data Unit Payload" and a padding "padding" are allocated. Consequently, in the present embodiment, the format of the QuickTime movie file is utilized effectively to form the thumbnail picture entry.

Also the sound entry is formed similarly utilizing the format of the QuickTime movie file effectively.

The property entry has registered therein extract information not only of files recorded on the optical disk 2 which are management object files but also existing folders, virtual folders and management object files virtually disposed in the virtual folders according to the file management system for the optical disk 2. In each of the slots of the property entries, a slot number (entry number) for specifying the slot and identification information for identifying existing files and folders and virtual files and folders are set as seen in FIG. 4. It is to be noted that also the other entries described hereinabove can have similarly registered therein existing folders, virtual folders and management object files virtually disposed in the virtual folders. Consequently, the index file can be used to manage the management object files in accordance with a hierarchical structure ready for the file management system for the optical disk 2 or in accordance with a hierarchical structure based on virtual folders including favorite files or the like set by the user.

Further, the property entry is formed from slots having a fixed length similarly as in the other entries. Consequently, if extract information regarding the property cannot be allocated to one slot, a plurality of slots are allocated to one management object file or one folder. It is to be noted that, where a plurality of slots are allocated to a folder in the property entry or the other entries, any other slot than the top slot is hereinafter referred to as extension slot.

Further, where a plurality of slots are set for one management object file or slot similarly in any of the other entries, also in the property entry, a plurality of slots are allocated so as to correspond to the slots of the entry.

Consequently, for example, to a folder or the like in which none of the thumbnail picture entry, text entry and sound entry is set, extract information corresponding to one or a plurality of slots is allocated in accordance with the data amount of the extract information regarding the property. Meanwhile, to a file or a folder in which each of the thumbnail picture entry, text entry and sound entry is formed from one slot, extract information corresponding to one or a plurality of slots is allocated in accordance with the data amount of the extract information regarding the property similarly. On the other hand, to a file or a folder in which any of the thumbnail picture entry, text entry and sound entry is formed from a plurality of slots, a number of slots corresponding to the entry which includes the great number of slots among the thumbnail picture entry, text entry and sound entry are set even where the data amount of the extract information regarding the property is sufficiently small.

In the property entry, each of the slots has set therein for each of the text entry, thumbnail picture entry and sound entry a presence/absence flag which represents whether or not there exists a corresponding slot in the text entry, thumbnail picture entry or sound entry. Further, a slot number which is identification information pointing to the corresponding slot is set for each of the text entry, thumbnail picture entry and sound entry.

Further, in the property entry, when a succeeding slot to a particular slot exists, an extension slot number which is information representative of the succeeding slot number is set in the plural slots. It is to be noted that, where no corresponding slot exists, a value having no meaning is set to the extension slot number and the slot numbers. Consequently, where one slot is allocated to the last one of the plural slots and one entry, presence/absence of a corresponding to the other entries and so forth can be detected.

Furthermore, in the property entry, where a corresponding slot of another entry to a slot thereof is an extension slot, an extension flag as extension information representing that the corresponding slot of the different entry is an extension slot is set corresponding to the text entry, thumbnail picture entry or sound entry.

Further, in each slot of the property entry, a valid/invalid flag representing whether the slot is valid or invalid is set so as to cope with deletion of a management object file only by an operation of the flag. It is to be noted that, in each slot of the property entry, for example, information of a referencing relationship regarding a divisional file, information of an order of reproduction and so forth are allocated additionally as management information.

Consequently, if the extension slot number representative of a succeeding extension slot is successively traced to detect a slot of the property entry, the slots of the property in the property entry to which extract information of one file or one folder can be detected. Further, the slots of the other entries to which the extract information of the one file or folder is allocated can be detected with reference to the presence/absence flag, slot number and extension flag set to the slots of the property entry detected in this manner. Consequently, a combination of slots to which the extract information of the one file or folder can be detected with reference only to the different kinds of information of the property.

From the foregoing, in the present embodiment, where an index file is formed from groups of data wherein extract information is collected for different types and one of the groups of data is used to collectively manage the other groups of data, a process relating to deletion or addition of extract information can be executed simply, easily and with certainty by processing of the presence/absence flags, slot numbers, extension slot number, extension flags and valid/invalid flag described above.

FIGS. 5 and 6 are tables illustrating the header of the property entry. Referring to FIGS. 5 and 6, the header of the property entry has successively allocated therein information representative of a header size "header-size", a type of the brand "brand-type", a type of the header "header-type" and a version of the header "header-version" similarly to the headers of the other entries. Consequently, the entry in which the header is provided can be identified as the property entry, and further, the version can be detected.

The header of the property entry further has successively allocated therein an actual data Size of the header "header-data-size", a unique ID unique to the header "unique-ID" and information of the property entry "property entry information". In the header of the property entry, a version of the property entry "property-entry-version" and a slot size of the property entry "entry-size" are allocated to the information of the property entry. Further, production time of the property entry "creation-time", updating time of the property entry "modification-time", entry sort flags for the individual folders "property-status-flags" and a size of the entry index "entry-index-size" are successively allocated next.

Further, in the header of the property entry, various kinds of information where the entry index has a 2-byte length and various kinds of information where the entry index has a length other than the 2-byte length are allocated. Here, to the information where the entry index has the 2-byte length, an upper limit value "maximum-entry-count" to the number of slots of the property entry on a format, a total number of the slots of the property entry "next-entry-index", an entry slot number of a root folder "root-folder-entry-index" and a last valid slot number "last-valid-entry-index" pointing to the last one of those slots which are set to valid with the valid/invalid flag are allocated.

In contrast, to the information where the entry index has a length other than the 2-byte length, an upper limit value "maximum-entry-count" to the number of slots of the property entry on a format, a total number of the slots of the property entry "next-entry-index", an entry slot number of a root folder "root-folder-entry-index" and a last valid slot number "last-valid-entry-index" pointing to the last one of those slots which are set to valid with the valid/invalid flag are allocated.

Consequently, in the present embodiment, it is possible to detect the size of each slot from the slot size of the property entry "entry-size" and detect the number of slots of the property entry from the total number of slots of the property entry "next-entry-index" as seen from FIG. 7. Further, also where the index file recorded on the optical disk 2 has a large number of free slots, it is possible to detect a slot positioned at the last from among those slots which are not set to free slots. Consequently, wastefulness caused by free slots can be reduced.

In the header of the property entry, information of the title entry "title file information" is allocated next. Here, to the information of the title entry, a number of files of the title entry "number-of-title-files is allocated, and for each title file number "num-of-title-files", a title file ID "title-file-ID", a total number of slots of the title entry of the file "number-of-title-entries-in-this-file" where the entry index has the 2-byte length and a total number of slots of the title entry of the file "number-of-title-entries-in-this-file" where the entry index has a length other than the 2-byte length are repetitively allocated.

In the header of the property entry, information of the thumbnail picture entry "thumbnail picture file information" is allocated next. To the information of the thumbnail picture entry, a number of files of the thumbnail picture entry "number-of-thumbnail-files" is allocated, and for each thumbnail picture file number "num-of-thumbnail-files", a thumbnail picture file ID "thumbnail-picture-file-ID", a total number of slots of the thumbnail picture entry of the file "number-of-thumbnail-picture-entries-in-this-file" where the entry index has the 2-byte length and a total number of slots of the thumbnail picture entry of the file "number-of-thumbnail-picture-entries-in-this-file" where the entry index has a length other than the 2-byte length are repetitively allocated.

Further, in the header of the property entry, a unique extension region "Extension Data Unit Payload" and a padding "padding" are allocated next. Consequently, in the present embodiment, the format of the QuickTime movie file is utilized effectively also to form the property entry.

In the present embodiment, the system control microcomputer 19 records an index file on an optical disk 2 in advance upon an initialization process for the optical disk 2. In the index file recorded in advance in this manner, a number of slots considered to sufficiently allow recording of management object files on the optical disk 2 and registration of extract information of the object files where the slots are set as free slots each by the setting of the valid/invalid flag are set in each of the entries, and the various headers and so forth described hereinabove are set so as to correspond to the settings of the entries. Thus, in the present embodiment, the index file is recorded in physically continuous regions in a top region of the optical disk 2 thereby to minimize the time required for starting of processing of the optical disk 2.

Then, if the optical disk 2 on which the index, file is recorded in this manner is loaded into the optical disk apparatus 1, then the system control microcomputer 19 reproduces the index file, stores the data recorded in the index file into the built-in memory thereof and provides various kinds of information for index to the user based on the data stored in the built-in memory. Further, the system control microcomputer 19 records a file or the like of an image pickup result on the optical disk 2 in response to an operation of the user, acquires extract information in response to the recording of the file on the optical disk 2, and stores the acquired extract information into the built-in memory. Further, upon unloading or the like of the optical disk 2, the system control microcomputer 19 updates the index file recorded on the optical disk 2 with the extract information stored in the memory in this manner.

In such a sequence of processes relating to the index file as just described, the system control microcomputer 19 reads out, based on the last valid slot number set in the property entry header, the data of the slots which form the property entry at a stroke up to the slot indicated by the last valid slot number and expands the read out data of the slots into the memory. However, the system control microcomputer 19 omits reproduction of those slots on the last end side succeeding the last valid slot number from the recording medium.

Figure 8:
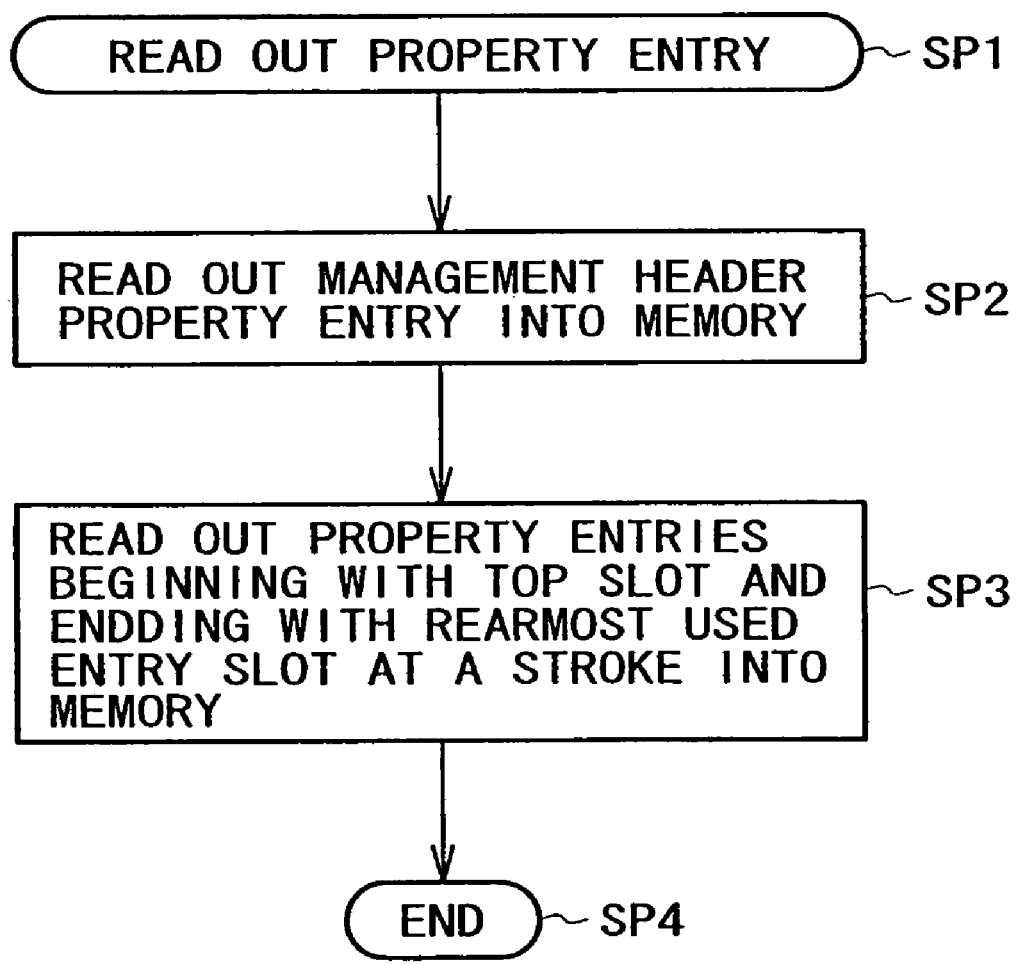
FIG. 8 is a flow chart illustrating a procedure for reproduction of the property entry.

FIG. 8 illustrates a processing procedure of the system control microcomputer 19 for reading out of the index file. If an optical disk 2 is loaded into the optical disk apparatus 1 or a resetting operation element is operated, then the system control microcomputer 19 executes the processing procedure of FIG. 8 to read the index file recorded on the optical disk 2 into the built-in memory.

In particular, the system control microcomputer 19 advances its processing from step SP1 to step SP2, at which it acquires management information according to, the file management system of the optical disk 2 and acquires the address of the index file from the management information. Further, the system control microcomputer 19 starts reproduction of the index file beginning with the acquired address and records the data of the property entry header of the index file into the built-in memory.

Then, the system control microcomputer 19 advances the processing to step SP3, at which it detects the last valid slot number from the data of the property entry header stored in the memory. Further, the system control microcomputer 19 detects the length of data necessary to reproduce the slot pointed to by the last valid slot number from the last valid slot number detected in such a manner as described above and the slot size and the size of the header of the property entry detected similarly from the property entry header. The system control microcomputer 19 sets the detected data length to a parameter and outputs a reproduction command of the index file. Consequently, the system control microcomputer 19 successively acquires data of the slot beginning with the top slot and ending with the slot corresponding to the last valid slot number of the property entry at a stroke and records the acquired data into the built-in memory. Thereafter, the system control microcomputer 19 advances the processing to step SP4, at which it ends the processing procedure.

2. Operation of the Embodiment

In the optical disk apparatus 1 (FIG. 1) having such a configuration as described above, video data and audio data acquired by the image pickup system and the sound acquisition system are encoded by the video encoder 11 and the audio encoder 12, respectively, and then converted into a data stream of a QuickTime movie file by the file producer 15. The data stream is recorded on an optical disk 2 by a recording system formed from the memory controller 18, error correction encoder/decoder 21, data modulator/demodulator 23, magnetic field modulation driver 24 and optical pickup 33. Consequently, in the optical disk apparatus 1, a result of the image pickup is recorded as a QuickTime movie file on the optical disk 2. Further, output data of the system control microcomputer 19 is outputted to the recording system of the optical disk apparatus 1 so as to be compatible with the recording of the file of the optical disk 2. Consequently, management information of the file management system for the optical disk 2 is updated so as to be compatible with the recording of the QuickTime movie file.

The QuickTime movie file recorded in this manner is successively reproduced through the optical pickup 33, data modulator/demodulator 23, error correction encoder/decoder 21 and memory controller 18 based on the management information of the file management system and then decomposed into elementary streams of video data and audio data by the file decoder 16. The elementary streams of video data and audio data are decoded by and outputted from the video decoder 13 and the audio decoder 14, respectively.

In the optical disk apparatus 1, when it initializes an optical disk 2 on and from which such a QuickTime movie file as described above is to be recorded and reproduced while no file is recorded thereon, an index file wherein a QuickTime movie file is set as an object of management is recorded on the optical disk 2.

In order that extract information acquired from a QuickTime movie file may be recorded collectively for individual groups having different attributes, the index file is formed from a property entry, a text entry, thumbnail entry and a sound entry which correspond to the attributes of extract information and are each formed from a sequence of slots of a fixed length to which the corresponding extract information is allocated (FIGS. 9A to 9D). Further, in each of the slots of the property entry to which the property information is allocated from among the entries mentioned, the valid/invalid information representative of whether the slot and corresponding slots of the other groups specified with the slot numbers set in the slot of the property entry is set to invalid thereby to set the slot as a free slot. Thus, the property entry whose slots are set as free slots are recorded on the optical disk 2.

Consequently, the optical disk apparatus 1 can record the index file in physically continuous regions of a top region of the optical disk 2 thereby to minimize the time required for starting up of operation.

In particular, in response to loading of an optical disk 2 or to a resetting operation, the optical disk apparatus 1 reproduces management information for files according to a file management system of the optical disk 2 and stores the management information into the built-in memory, and then reproduces the corresponding file from the optical disk 2 in accordance with the stored contents of the built-in memory. Further, the optical disk apparatus 1 reproduces the index file subsequently to the management information from the optical disk 2 and stores the index file into the built-in memory.

The optical disk apparatus 1 records a file of an image pickup result and so forth on the optical disk 2 in response to an operation of the user, acquires extract information in response to the recording of the file on the optical disk 2, stores the acquired extract information into the built-in memory and updates the index file stored in the memory. Further, upon unloading of the optical disk 2 or the like, the optical disk apparatus 1 updates the index file recorded on the optical disk 2 with the extract information stored in this manner in the memory. Further, the optical disk apparatus 1 provides various kinds of information which form the index file to the user based on the data stored in the memory so that a desired file can be detected simply, easily and with certainty with reference to thumbnail pictures or the like of various files.

Consequently, in the optical disk apparatus 1, immediately after an optical disk 2 is initialized, all slots which form the index file are set as free slots. However, as recording of a QuickTime movie file on the optical disk 2 is repeated, extract information is successively registered into the free slots of the index file and the number of remaining free slots decreases. Even where extract information is registered once in this manner, if an instruction to delete an object file is issued from the user, then the system control microcomputer 19 sets the valid/invalid flag of the corresponding slot or slots to invalid thereby to form a free slot or slots. Further, also when a favorite file of the user is registered or in response to setting of a folder by a microcomputer to which the optical disk apparatus 1 is connected, extract information is registered into a free slot or slots and the valid/invalid flag of the slot or each of the slots is set to valid. Furthermore, also upon deletion of such a folder as mentioned above, a free slot or slots are produced. It is to be noted that, in response to such a series of operations for registration of extract information, the optical disk apparatus 1 updates also the management information set in a slot or slots of the property entry for managing the other entries in the form of slot numbers pointing to corresponding slots of the other groups.

Consequently, in the property entry E4 of the optical disk apparatus 1, free slots (denoted as free) and valid slots (denoted by no character allocated) to which extract information is allocated are included in a mixed state as seen in FIG. 7 as a result of recording or deletion of a file on or from the optical disk 2, editing of the index file and so forth.

In accordance with such a state as described above, the optical disk apparatus 1 records the last valid slot number for specifying the last one of those slots in each of which the valid/invalid flag as valid/invalid information is set to valid into the header PH of the property entry E4 on the top side of the property entry. Further, information of the size of the slots and the header size is recorded similarly in the header PH of the property entry. Consequently, the optical disk apparatus 1 can reduce useless accessing to the optical disk 2 upon loading of the optical disk 2 or upon resetting and further can reduce wasteful use of the capacity of the memory in which the index file is stored.

In particular, where the last valid slot number for specifying the last one of those slots in each of which the valid/invalid flag as valid/invalid information is set to valid is used, any slot on the last end side succeeding the slot specified by the last valid slot number can be discriminated as a free slot. Consequently, since the index file is reproduced up to the slot specified by the last valid slot number whereas reproduction of the remaining slots is omitted, wasteful accessing to the optical disk 2 can be reduced. Further, also where data of the property entry is to be stored into the memory, if storage of the remaining slots into the memory is omitted, then wasteful use of the capacity of the memory can be prevented.

Consequently, since the optical disk apparatus 1 reproduces the index file up to the slot specified by the last valid slot number but omits reproduction of the remaining slots, it decreases wasteful accessing to the optical disk 2, prevents wasteful use of the capacity of the memory and thereby reduces the wastefulness caused by free slots.

Furthermore, upon reproduction of the index file up to the last valid slot number, the optical disk apparatus 1 stores data reproduced collectively from the index file into the built-in memory (FIG. 8) so that it can start up its operation in a shorter period of time.

3. Advantages of the Embodiment

With the optical disk apparatus 1 having the configuration described above, since each slot of the property entry has set therein a valid/invalid flag as valid/invalid information representative of whether the slot is valid or invalid and the last valid slot number indicative of the last slot of those slots which are set to valid with the valid/invalid information is set to the header of the property entry, wastefulness caused by free slots can be reduced.

In particular, by omitting, upon reproduction of the index file from a recording medium, reproduction of those slots on the last end side succeeding the last slot pointed to by the last valid slot number, wastefulness caused by the free slots on the last end side succeeding the valid last slot can be prevented effectively.

Further, by reproducing, based on the last valid slot number, the valid slots of the property entry up to the valid last slot collectively from the recording medium and storing the reproduced data into the memory, the time required for starting up can be reduced.

4. Other Embodiments

In the embodiment described above, upon loading of an optical disk or upon resetting, valid slots of the property entry up to the valid last slot are reproduced collectively from the recording medium and stored into the memory. However, the present invention is not limited to this, but even where the property entry is reproduced from an optical disk, for example, in a unit of a predetermined number of slots or in a like case, by omitting reproduction of the free slots on the last end side succeeding the valid last slot pointed to by the last valid slot number, wastefulness caused by the free slots on the last end side succeeding the valid last slot can be prevented effectively.

Further, in the embodiment described hereinabove, the present invention is applied to an optical disk apparatus which records a result of image pickup, an output of a personal computer and so forth. However, the present invention is not limited to this but can be applied widely to such a case wherein a large number of files recorded on various recording media such as a magneto-optical disk or a hard disk apparatus are managed or to another case wherein a large number of files retained in a predetermined server are managed or further to a like case.

Further, in the embodiments described hereinabove, management object files each in the form of a QuickTime movie file are managed. However, the present invention is not limited to this but can be applied widely also where files of video data, files of audio data or like files of various formats are managed.

Further, in the embodiments described hereinabove, a series of processes are executed in accordance with a processing program installed in advance in the system control microcomputer 19. However, the present invention is not limited to this but can be applied widely also where such a program as mentioned above is provided in the form of a recording medium or through a network such as the Internet and a series of processes are executed in accordance with the program. It is to be noted that, for such a recording medium as mentioned above, various recording media such as an optical disk and a magnetic tape can be applied widely.

While preferred embodiments of the present invention have been described using specific terms, such description is for illustrative purpose only, and it is to be understood that changes and variations may be made without departing from the spirit or scope of the following claims.

What is claimed is:

1. A file management method for managing a plurality of files containing content recorded on a recording medium, comprising the steps of:

classifying different types of extract information, extracted from the content of different files, into plural different groups including a property group to which property information of the files is allocated and one or more different groups corresponding to said types of extract information, said property group of files and said different groups of files comprising an index file;

allocating the extract information of one of the files to a plurality of slots in at least one of the different groups, each of said plurality of slots in said at least one group exhibiting fixed slot length; and allocating information describing the one file to a plurality of the fixed slot length slots in the property group so that said property group has slots corresponding to the slots of the at least one different group, wherein each of the slots of the property group has set therein management information for managing that slot of the property group and said management information also managing the corresponding slot of the at least one different group, wherein the management information of each of the slots of the property group has set therein a slot number for specifying the corresponding slot of the at least one different group and valid/invalid information, said valid information in a respective slot of the property group representing that the respective slot of the property group and the corresponding slot of the at least one different group are valid slots, wherein useful information is indicated as being stored in said valid slot of said at least one different group, and said invalid information in a respective slot of the property group representing that the respective slot of the property group and the corresponding slot of the at least one different group are invalid slots, thereby representing a free slot in said at least one different group in which useful information is not stored, and wherein the property group has a header containing a last valid slot number for identifying the slot number of the last slot of the property group that is set to valid, thereby identifying the slot number of the last slot of the property group and the last slot of the at least one different group in which useful information is stored, so that when searching the one file for content, the index file is not searched beyond the last slot of the property group that is identified by said slot number.

2. A computer-readable storage medium storing a computer program to cause a computer to execute a predetermined procedure to manage a plurality of files containing content recorded on a recording medium, said program consisting of instructions to control the computer to perform the method comprising the steps of:

classifying different types of extract information, extracted from the content of different files, into plural different groups including a property group to which property information of the files is allocated and one or more different groups corresponding to said types of extract information, said property group of files and said different groups of files comprising an index file;

allocating the extract information of one of the files to a plurality of slots in at least one of the different groups, each of said plurality of slots in said at least one group exhibiting fixed slot length; and allocating information describing the one file to a plurality of the fixed slot length slots in the property group so that said property group has slots corresponding to the slots of the at least one different group, wherein each of the slots of the property group has set therein management information for managing that slot of the property group and said management information also managing the corresponding slot of the at least one different group, wherein the management information of each of the slots of the property group has set therein a slot number for specifying the corresponding slot of the at least one different group and valid/invalid information, said valid information in a respective slot of the property group representing that the respective slot of the property group and the corresponding slot of the at least one different group are valid slots, wherein useful information is indicated as being stored in said valid slot of said at least one different group, and said invalid information in a respective slot of the property group representing that the respective slot of the property group and the corresponding slot of the at least one different group are invalid slots, thereby representing a free slot in said at least one different group in which useful information is not stored, and wherein the property group has a header containing a last valid slot number for identifying the slot number of the last slot of the property group that is set to valid, thereby identifying the slot number of the last slot of the property group and the last slot of the at least one different group in which useful information is stored, so that when searching the one file for content, the index file is not searched beyond the last slot of the property group that is identified by said slot number.

3. A computer-readable recording medium on which a program for a file management method for causing a computer to execute a predetermined procedure to manage a plurality of files containing content recorded on the recording medium is recorded, the processing procedure comprising the steps of:

classifying different types of extract information, extracted from the content of different files, into plural different groups including a property group to which property information of the files is allocated and one or more different groups corresponding to said types of extract information, said property group of files and said different groups of files comprising an index file;

allocating the extract information of one of the files to a plurality of slots in at least one of the different said groups, each of said plurality of slots in said at least one group exhibiting fixed slot length; and allocating information describing the one file to a plurality of the fixed slot length slots in the property group so that said property group has slots corresponding to the slots of the at least one different group, wherein each of the slots of the property group has set therein management information for managing that slot of the property group and said management information also managing the corresponding slot of the at least one different group, wherein the management information of each of the slots of the property group has set therein a slot number for specifying the corresponding slot of the at least one different group and valid/invalid information, said valid information in a respective slot of the property group representing that the respective slot of the property group and the corresponding slot of the at least one different group are valid slots, wherein useful information is indicated as being stored in said valid slot of said at least one different group, and said invalid information in a respective slot of the property group representing that the respective slot of the property group and the corresponding slot of the at least one different group are invalid slots, thereby representing a free slot in said at least one different group in which useful information is not stored, and wherein the property group has a header containing a last valid slot number for identifying the slot number of the last slot of the property group that is set to valid, thereby identifying the slot number of the last slot of the property group and the last slot of the at least one different group in which useful information in stored, so that when searching the one file for content, the index file is not searched beyond the last slot of the property group that is identified by said slot number.

* * * * *